US012230489B2

(12) United States Patent
Hager

(10) Patent No.: US 12,230,489 B2
(45) Date of Patent: Feb. 18, 2025

(54) HIGH PRESSURE MASS ANALYZER

(71) Applicant: DH TECHNOLOGIES DEVELOPMENT PTE. LTD., Singapore (SG)

(72) Inventor: James Hager, Missisauga (CA)

(73) Assignee: DH TECHNOLOGIES DEVELOPMENT PTE. LTD., Singapore (SG)

( * ) Notice: Subject to any disclaimer, the term of this patent is extended or adjusted under 35 U.S.C. 154(b) by 393 days.

(21) Appl. No.: 17/792,656

(22) PCT Filed: Jan. 14, 2021

(86) PCT No.: PCT/IB2021/050262
§ 371 (c)(1),
(2) Date: Jul. 13, 2022

(87) PCT Pub. No.: WO2021/144737
PCT Pub. Date: Jul. 22, 2021

(65) Prior Publication Data
US 2023/0027201 A1 Jan. 26, 2023

Related U.S. Application Data

(60) Provisional application No. 62/961,180, filed on Jan. 14, 2020.

(51) Int. Cl.
*H01J 49/00* (2006.01)
*H01J 49/06* (2006.01)

(52) U.S. Cl.
CPC .......... *H01J 49/004* (2013.01); *H01J 49/063* (2013.01)

(58) Field of Classification Search
CPC .............................. H01J 49/004; H01J 49/063
See application file for complete search history.

(56) References Cited

U.S. PATENT DOCUMENTS

2011/0121175 A1* 5/2011 Yasuno ................. H01J 49/062 250/292
2011/0163227 A1 7/2011 Makarov et al.
2012/0326023 A1* 12/2012 Kozole ................ G01N 27/623 250/288

FOREIGN PATENT DOCUMENTS

EP 2665085 A2 11/2013
EP 3462476 A1 4/2019
WO 2018142265 A1 8/2018

OTHER PUBLICATIONS

International Search Report and Written Opinion, PCT/IB2021/050262, dated Mar. 23, 2021, 10 pages.

* cited by examiner

*Primary Examiner* — Nicole M Ippolito
(74) *Attorney, Agent, or Firm* — Potomac Law Group, PLLC; Reza Mollaaghababa; Brian Hairston

(57) ABSTRACT

In one aspect, a mass spectrometer is disclosed, which comprises a Fourier Transform (FT) mass analyzer having an input port for receiving ions and an exit port through which the ions exit the FT mass analyzer, a detector disposed downstream of said FT analyzer for detecting ions exiting the FT analyzer, and a multi-segment ion guide having a plurality of segments, said multi-segment ion guide being disposed upstream of said FT mass analyzer and having an input port for receiving ions and an output port through which ions exit the FT mass analyzer. The segments of the ion guide are configured to be independently activated via application of a DC offset voltage thereto so as to adjust a length through which ions passing through the ion guide experience collisional cooling.

17 Claims, 8 Drawing Sheets

HIGH PRESSURE MASS ANALYZER

RELATED APPLICATION

This application claims priority to U.S. provisional application No. 62/961,180 filed on Jan. 14, 2020, entitled "High Pressure Mass Analyzer," which is incorporated herein by reference in its entirety.

FIELD

The present teachings are generally directed to methods and systems for performing mass spectrometry, and more particularly, to such methods and systems that employ a multi-segment ion guide to modulate the spatial extent along which ions undergo collisional cooling.

BACKGROUND

Mass spectroscopy (MS) is an analytical technique for determining the elemental composition of test substances with both quantitative and qualitative applications. For example, MS can be used to identify unknown compounds, to determine the isotopic composition of elements in a molecule, and to determine the structure of a particular compound by observing its fragmentation, as well as to quantify the amount of a particular compound in the sample.

In a Fourier Transform (FT) mass spectrometer, an excitation signal is periodically applied to the multipole rod(s) or an auxiliary electrode of the spectrometer to excite some or all of the ions within the FT mass spectrometer to some large radial amplitude. The "slug" of ions so excited oscillate radially at the secular frequencies determined by properties of the quadrupole and the ions. The excited ions interact with the exit fringing fields, where the interaction converts their radial oscillations into axial oscillations. These axial oscillations can be detected by an ion detector. The detected time domain signal can then be Fourier transformed into the frequency domain, which can in turn be used to calculate m/z ratios. In such FT mass spectrometer, frequency resolution and thus mass resolution, is determined in large part by the temporal extent (length) of the oscillatory signal, which is in turn largely determined by ion velocities.

The damping of ion velocities via collision with a background gas can reduce ions' energies, and hence their velocities, which can help increase mass resolution. But collisional damping itself can reduce the extent (length) of the oscillatory signal, as demonstrated by data presented in FIGS. 1A, 1B, and 1C in which the pressure in an FT quadrupole mass analyzer is increased into the milli-torr pressure range. Specifically, FIGS. 1A, 1B, and 1C show transient ion current oscillations collected following radial excitation of protonated reserpine (m/z=609) in pressurized quadrupole mass analyzer. FIG. 1A shows measured oscillatory ion signal for ions having an energy of 1 eV and no added collision gas. FIG. 1B shows measured oscillatory ion signal in presence of the moderating effect of an added nitrogen background on the reserpine ion velocity, leading to a longer oscillatory transient signal. FIG. 1C in turn shows the effect of high background nitrogen gas pressure, where the collisional damping itself has reduced the temporal extent (length) of the oscillatory transient ion signal.

The pressure regime that would provide the optimal temporal extent of the transient oscillatory signals is not sufficient to collisionally cool the ion beam when the entrance energy is high, such as when high entrance energies are required for collision activated dissociation (CAD).

Although the pressure within the mass analyzer could be increased, but such an increase in the pressure can lead to shorter transients and poorer resolution.

Accordingly, there is a need for improved FT mass analyzers that would allow collisional cooling of ions while providing desired mass resolution.

SUMMARY

In one aspect, a mass spectrometer is disclosed, which comprises a Fourier Transform (FT) mass analyzer having an input port for receiving ions and an exit port through which the ions exit the FT mass analyzer, a detector disposed downstream of said FT analyzer for detecting ions exiting the FT analyzer, and a multi-segment ion guide having a plurality of segments, said multi-segment ion guide being disposed upstream of said FT mass analyzer and having an input port for receiving ions and an output port through which ions exit the FT mass analyzer. The segments of the ion guide are configured to be independently activated via application of a DC offset voltage thereto so as to adjust a length through which ions passing through the ion guide experience collisional cooling.

The number of the segments of the multi-segment ion guide can vary. For example, the multi-segment ion guide can have between about 2 and about 200 segments that can be independently activated, e.g., via application of a DC offset voltage thereto, so as to adjust the length along which the ions undergo collisional cooling as they traverse the multi-segment ion guide. By way of example, the effective collisional-cooling length of the multi-segment ion guide can be adjusted in a range of about 10 mm to about 1000 mm.

Each segment of the multi-segment ion guide can include a plurality of rods that are arranged in a multi-pole configuration. For example, the plurality of rods can be arranged in any of quadrupole, hexapole or octupole configuration.

In some embodiments, the mass spectrometer can include at least one DC voltage source for applying one or more DC offset voltage(s) to one or more segments of the multi-segment ion guide. More specifically, in many embodiments, the DC voltage source applies the DC offset voltage to one or more rods of two adjacent segments of the multi-segment ion guide.

In some embodiments, the FT analyzer comprises a plurality of rods that are arranged in a multi-pole configuration, such as, a quadrupole, a hexapole or an octupole configuration.

In some embodiments, the multi-segment ion guide can be maintained at a pressure in a range of about 0.5 to about 2 mTorr. In some such embodiments, the FT mass analyzer is maintained at a pressure in a range of about 0.5 to about 2 mTorr.

In some embodiments, the mass spectrometer can further include an RF voltage source for applying an RF voltage to one or more segments of the ion guide for radial confinement of the ions as they pass through the multi-segment ion guide. Further, in some embodiments, the mass spectrometer can further include an AC voltage source for applying an excitation voltage to at least one rod of the FT mass analyzer so as to radially excite a fraction of the ions at their secular frequencies. In some embodiments, the FT mass analyzer comprises an auxiliary electrode and the AC voltage source applies the AC excitation voltage to said auxiliary electrode.

In some embodiments, a multipole mass analyzer (e.g., a quadrupole, hexapole, or octupole mass analyzer) is disposed upstream of the multi-segment ion guide. In some such embodiments, an ion guide (e.g., a quadrupole ion guide) is positioned upstream of the multipole mass analyzer for receiving ions generated by an upstream ion source and focusing those ions into an ion beam.

Further understanding of various aspects of the present teachings can be obtained by reference to the following detailed description in conjunction with the associated drawings, which are described briefly below.

DETAILED DESCRIPTION

The present teachings are generally directed to a Fourier Transform (FT) mass spectrometer in which a multi-segment ion guide is disposed upstream of an FT mass analyzer to increase the number of collisions of ions passing through the multi-segment ion guide with a background gas in order to dampen the axial energy of the ions prior to their entry into the FT mass analyzer while ensuring the pressure is not too high to decrease the temporal extent of the axial oscillatory transient signal. As discussed in more detail below, various segments of the multi-segment ion guide can be selectively activated, e.g., via application of a DC offset voltage thereto. By selectively activating different segments of the multi-segment ion guide, the effective length within the ion guide in which the ions introduced into the ion guide can undergo go collision with a background gas can be varied. As discussed in more detail below, the use of a multi-segment ion guide according to the present teachings can result in an increase in the number of energy damping collisions suffered by the ions by increasing the collision path length, rather than the pressure.

Figures 1A, 1B, 1C:
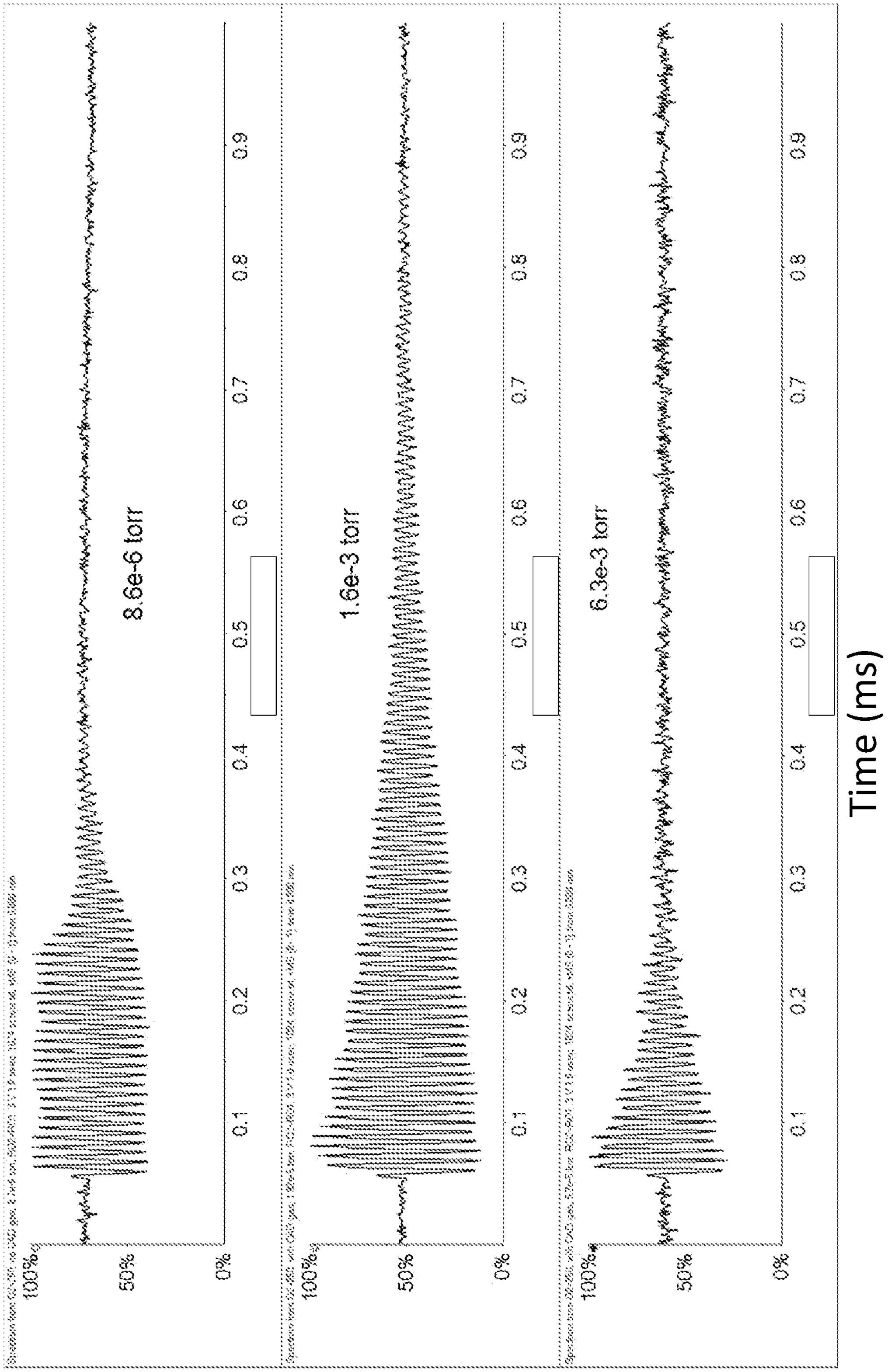
FIGS. 1A, 1B, and 1C show the effect of collisional damping on oscillatory, transient signals generated in a FT quadrupole mass analyzer with different pressures of background gas.
Figure 2:
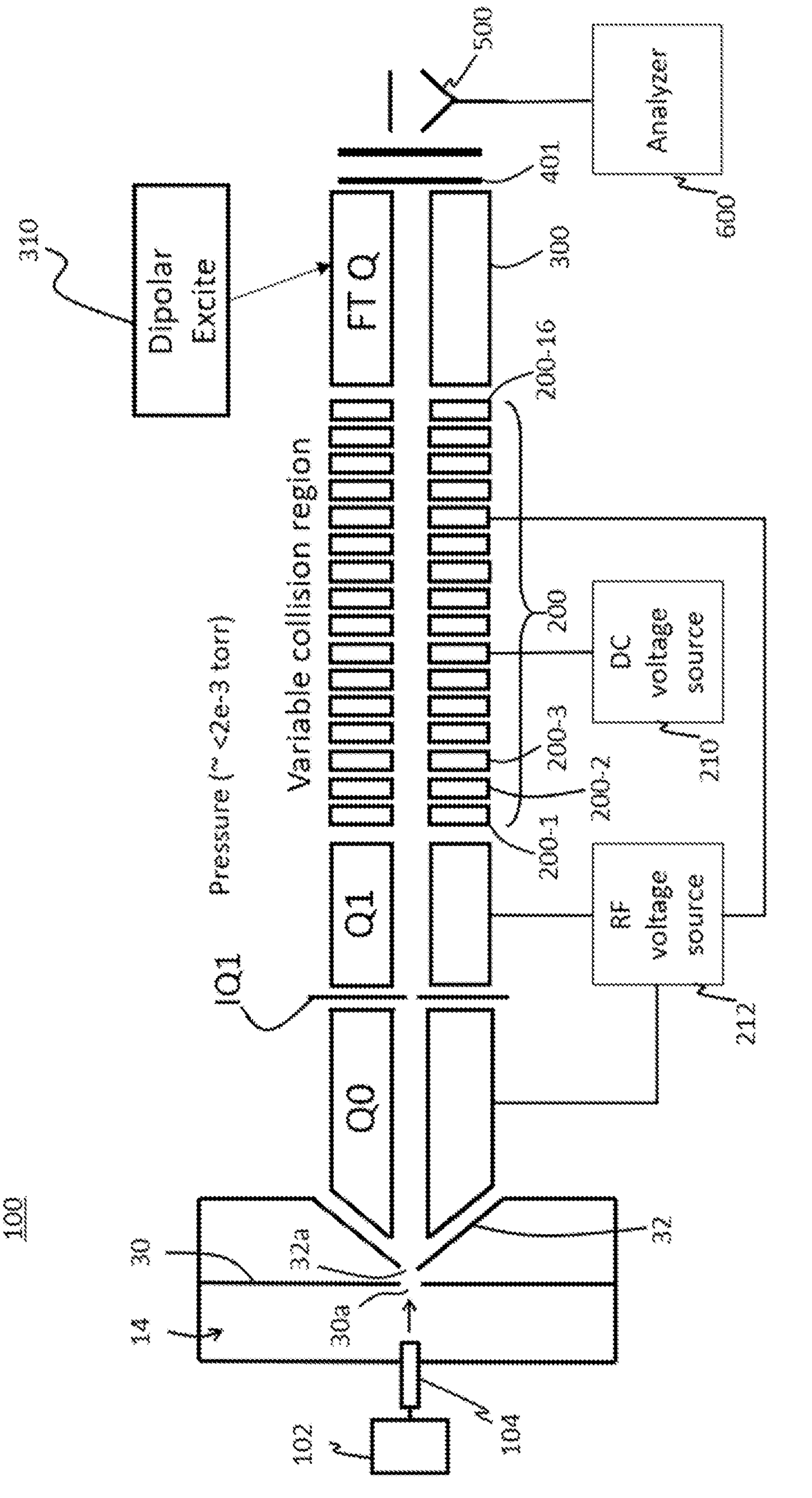
FIG. 2 is a schematic view of a mass spectrometer according to an embodiment, in which a multi-segment ion guide is employed, FIG. 3 schematically depicts accelerating ions between different segments of the multi-segment ion guide shown in FIG. 1, FIG. 4 schematically depicts a quadrupole mass spectrometer, indicating a plurality of examples in which the ion energy is increased as the ions traverse between different ion guides of the spectrometer.

FIG. 2 schematically depicts a Fourier Transform (FT) mass spectrometer 100 according to an embodiment of the present teachings, which includes a sample source 102 configured to provide a fluid sample to an ion source a 104 for generating ions within an ionization chamber 14. A variety of different types of ion sources can be employed. A non-exhaustive list of such ion sources can include, without limitation, an electrospray ionization device, a nebulizer-assisted electrospray device, a chemical ionization device, a nebulizer assisted atomization device, a matrix-assisted laser desorption/ionization (MALDI) ion source, a photoionization device, a laser ionization device, a thermospray ionization device, an inductively coupled plasma (ICP) ion source, a sonic spray ionization device, a glow discharge ion source, and an electron impact ion source, among others.

The ionization chamber 14, within which analytes contained within a fluid sample discharged from the ion source 104 can be ionized, is separated from a gas curtain chamber formed between a curtain plate 30 and an orifice plate 32, which include apertures 30*a* and 32*a* through which ions pass through these plates to reach downstream sections of the mass spectrometer. A curtain gas supply (not shown) can provide a curtain gas flow (e.g., of $N_2$) between the curtain plate 30 and the orifice plate 32 to aid in keeping the downstream sections of the mass spectrometer system clean by declustering and evacuating large neutral particles. By way of example, a portion of the curtain gas can flow out of the curtain plate aperture into the ionization chamber 14, thereby inhibiting and preferably preventing the entry of droplets through the curtain plate aperture. The curtain chamber can be maintained at an elevated pressure (e.g., about atmospheric pressure) while the downstream sections of the mass spectrometer can be maintained at one or more selected pressures by evacuation through one or more vacuum pumps (not shown), as discussed in more detail below.

After passing through the orifice plate 32, the ions are received by an ion guide Q0, which can provide focusing of the ion beam using a combination of gas dynamics and radio frequency fields. In this embodiment, the Q0 ion guide includes four rods that are arranged in a quadrupole configuration and to which RF and/or DC voltages can be applied for focusing the ions as they pass through the Q0 ion guide. In other embodiments, other multipole configurations, such as a hexapole or an octupole configuration, can be utilized. In some embodiments, the pressure of the Q0 ion guide can be maintained, for example, in a range of about 0.5 mTorr to about 2 mTorr.

The Q0 ion guide delivers the ions, via an ion lens IQ1, to a downstream ion guide Q1, which can function as a mass analyzer. Similar to the ion guide Q0, the ion guide Q1 includes four rods that are arranged in a quadrupole configuration (though in other embodiments, other multipole configurations can be employed) and to which RF and/or DC voltages can be applied. In some embodiments, the Q1 ion guide can be situated in a vacuum chamber that can be evacuated to a pressure that can be maintained at a value lower than that of the chamber in which Q0 ion guide is positioned. By way of example, the Q1 ion guide can be positioned in an evacuated chamber that is maintained at a pressure in a range of about 0.5 to about 2 mTorr.

The quadrupole rod set Q1 can be operated as a conventional transmission RF/DC quadrupole mass filter, which can be operated to select an ion of interest and/or a range of ions of interest. By way of example, the quadrupole rod set Q1 can be provided with RF/DC voltages suitable for operation in a mass-resolving mode. As should be appreciated, taking the physical and electrical properties of Q1 into account, parameters of an applied RF and DC voltage can be selected so that Q1 establishes a transmission window of chosen m/z ratios, such that these ions can traverse Q1 largely unperturbed. Ions having m/z ratios falling outside the window, however, do not attain stable trajectories within the quadrupole and can be prevented from traversing the quadrupole rod set Q1. It should be appreciated that this mode of operation is but one possible mode of operation for Q1.

In this embodiment, a multi-segment ion guide 200 according to the present teachings is disposed downstream and adjacent the Q1 ion guide to receive ions passing through the Q1 ion guide. In some embodiments, an ion lens (not shown in this embodiment) can be disposed between the exit port of the Q1 ion guide and the input port of the multi-segment ion guide 200 for focusing the ions as they pass from the Q1 ion guide into the multi-segment ion guide 200.

In this embodiment, the multi-segment ion guide 200 includes 16 ion guide segments (labeled as segments 200-1, . . . , 200-16) that can be independently activated, via application of a DC offset voltage, to change the length along which ions received by the multi-segment ion guide experience collisional cooling. In other embodiments, the number of segments employed to form the multi-segment ion guide can differ from 16. Typically, the number of the segments of the multi-segment ion guide can be, for example, in a range of about 2 to about 200.

Figure 3:
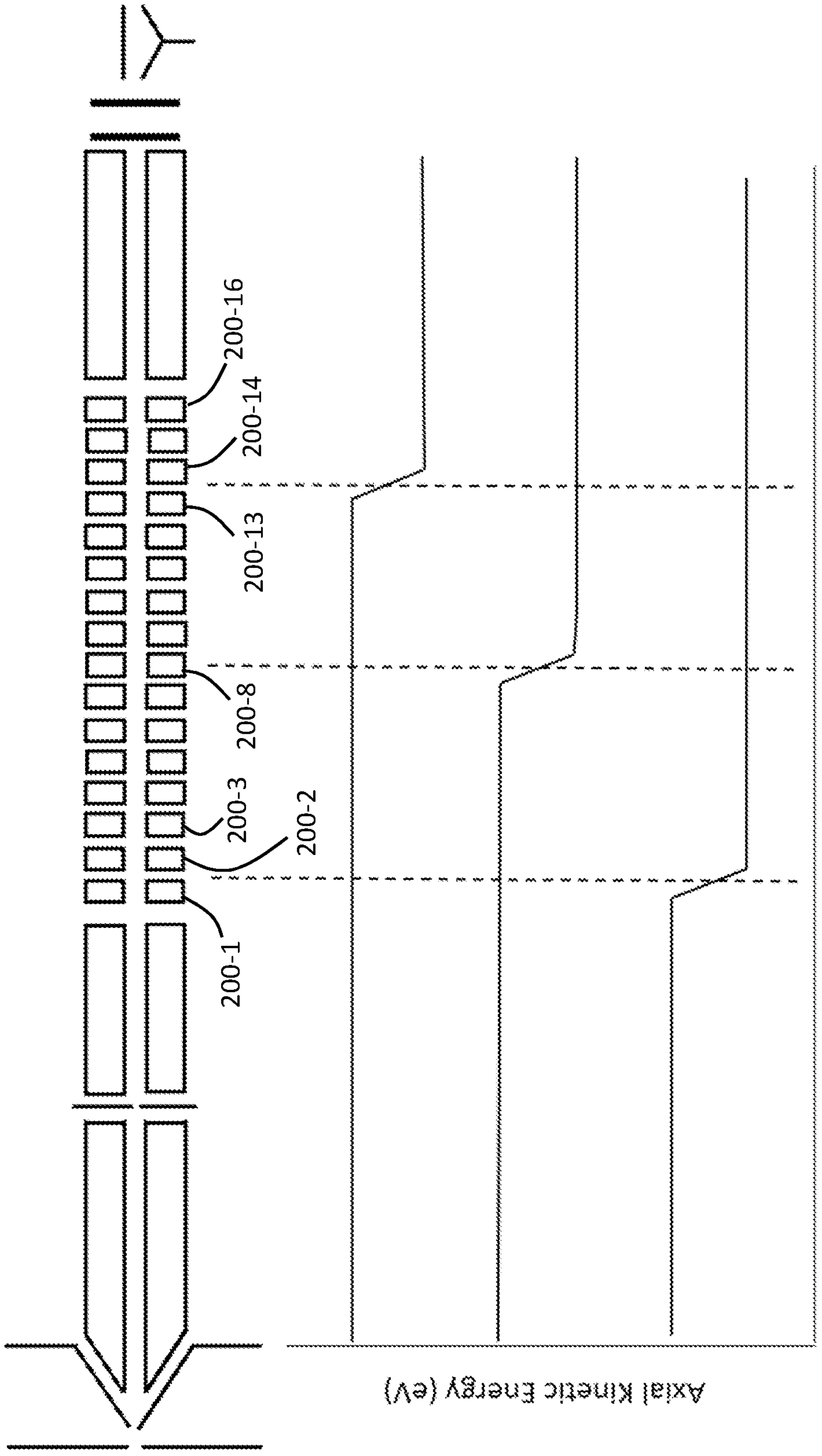

In this embodiment, a DC voltage source 210 allows the selective application of DC offset voltages to one or more segments of the multi-segment ion guide to modulate the length along which ions received by the multi-segment ion guide undergo collisional cooling following ion activation induced by an upstream voltage drop. For example, as shown schematically in FIG. 3, the application of a DC offset voltage between the first and second segments of the multi-segment ion guide can result in ion activation and fragmentation immediately following Q1 and allow collisional cooling occurs along substantially the entire length of the multi-segment ion guide. With continued reference to FIG. 3, the application of a DC offset voltage between the $7^{th}$ and the $8^{th}$ segments limits the effective length of collisional cooling to about one-half of the total length of the multi-segment ion guide while the application of a DC offset voltage between the $13^{th}$ and the $14^{th}$ segments, result in an effective length for collisional cooling that is substantially confined to the distal end of the multi-segment ion guide.

In some embodiments, the DC offset voltages can have magnitudes in a range of about 5 volts to about 50 volts.

An RF voltage source 212 can apply RF voltages to the rods of the Q0 and Q1 ion guides as well as the rods of various segments of the multi-segment ion guide to ensure radial confinement of ions as they pass through these components. While in this embodiment, a single RF voltage source is depicted, in some other embodiments, multiple RF voltage sources can be provided, where each RF voltage source can be configured to apply RF voltage(s) to one of Q0, Q1 as well as the multi-segment ion guide 200.

A Fourier Transform (FT) mass analyzer 300 is positioned downstream of the multi-segment ion guide 200 to receive the ions passing through the multi-segment ion guide. In this embodiment, the FT mass analyzer 300 includes four rods that are arranged in a quadrupole configuration, i.e., the FT mass analyzer is constructed as a quadrupole analyzer, though in other embodiment other multipole configurations may be employed. The RF voltage source 212 (or another RF voltage source) can apply RF voltage(s) to one or more rods of the quadrupole FT mass analyzer for providing radial confinement of the ions passing through the analyzer. In this embodiment, a pulsed AC voltage source 310 applies a dipolar AC excitation voltage to at least one of the quadrupole rods of the FT mass analyzer to radially excite at least a portion of the ions passing through the FT mass analyzer, as discussed in more detail below.

In some embodiments, the amplitude of the applied pulsed voltage can be, for example, in a range of about 10 volts to about 80 volts, or in a range of about 20 volts to about 50 volts, though other amplitudes can also be used. Further, the duration of the pulsed voltage (pulse width) can be, for example, in a range of about 10 nanoseconds (ns) to about 1 milliseconds, e.g., in a range of about 1 microsecond to about 100 microseconds, or in a range of about 5 microseconds to about 50 microseconds, or in a range of about 10 microseconds to about 40 microseconds, through other pulse durations can also be utilized. In general, a variety of pulse amplitudes and durations can be employed. In many embodiments, the longer is the pulse width, the smaller is the pulse amplitude. Ions passing through the quadrupole are normally exposed to only a single excitation pulse. Once the "slug" of the excited ions pass through the quadrupole, an additional excitation pulse can be triggered. This can normally occur every 1 to 2 ms, so that about 500 to 1000 data acquisition periods are collected at each second.

The waveform associated with the voltage pulse can have a variety of different shapes with the goal of providing a rapid broadband excitation signal. Without being limited to any particular theory, the application of the voltage pulse, e.g., across two diagonally opposed quadrupole rods, generates a transient electric field within the quadrupole. The exposure of the ions within the quadrupole to this transient electric field can radially excite at least some of those ions at their secular frequencies. Such excitation can encompass ions having different mass-to-charge (m/z) ratios. In other words, the use of an excitation voltage pulse having a short temporal duration can provide a broadband radial excitation of the ions within the quadrupole.

As the radially excited ions reach the end portion of the quadrupole rod set in the vicinity of the output end of the FT mass analyzer, they will interact with the exit fringing fields. Again, without being limited to any particular theory, such an interaction can convert the radial oscillations of at least a portion of the excited ions into axial oscillations.

The axially oscillating ions leave the quadrupole rod set via an exit lenses 401/402 to reach an ion detector 500. The detector 500 can generate a time-varying ion signal in response to the detection of the axially oscillating ions. A variety of detectors can be employed. Some examples of suitable detectors include, without limitation, Photonis Channeltron Model 4822C and ETP electron multiplier Model AF610.

An analyzer 600 (herein also referred to as an analysis module) that is in communication with the detector 500 can receive the detected time-varying signal and operate on that signal to generate a mass spectrum associated with the detected ions. More specifically, in this embodiment, the analyzer 500 can obtain a Fourier transform of the detected time-varying signal to generate a frequency-domain signal.

The analyzer can then convert the frequency domain signal into a mass spectrum using the relationships between the Mathieu a- and q-parameters and m/z.

$$a_x = -a_y = \frac{8zU}{\Omega^2 r_0^2 m} \quad \text{Eq. (1)}$$

$$q_x = -q_y = \frac{4zV}{\Omega^2 r_0^2 m} \quad \text{Eq. (2)}$$

where z is the charge on the ion, U is the DC voltage on the rods, if any, V is the RF voltage amplitude, Ω is the angular frequency of the RF, and $r_0$ is the characteristic dimension of the quadrupole. The radial coordinate r is given by $$r^2 = x^2 + y^2 \quad \text{Eq. (3)}$$

The Mathieu β-parameter is a continuing fractional expression of the a- and q-parameters, as is shown below:

$$\beta^2 = a + \cfrac{q^2}{(\beta+2)^2 - a - \cfrac{q^2}{(\beta+4)^2 - a - \cfrac{q^2}{(\beta+6)^2 - a - \ldots}}} + \cfrac{q^2}{(\beta-2)^2 - a - \cfrac{q^2}{(\beta-4)^2 - a - \cfrac{q^2}{(\beta-6)^2 - a - \ldots}}} \quad \text{Eq. (4)}$$

The secular frequency of an ion is given by $$\omega_n = (2n + \beta)\frac{\Omega}{2} \quad \text{Eq. (5)}$$

in which n=0, ±1, ±2, . . . . For the sake of illustration, consider only the n=0 term, so $$\omega_0 = \beta\frac{\Omega}{2} \quad \text{Eq. (6)}$$

which is the fundamental secular frequency.

The following example is provided for illustrating various aspects of the present teachings, and is not intended to necessarily provide the optimal way of practicing the present teachings or the optimal results that can be obtained.

Example 1

Figure 4:
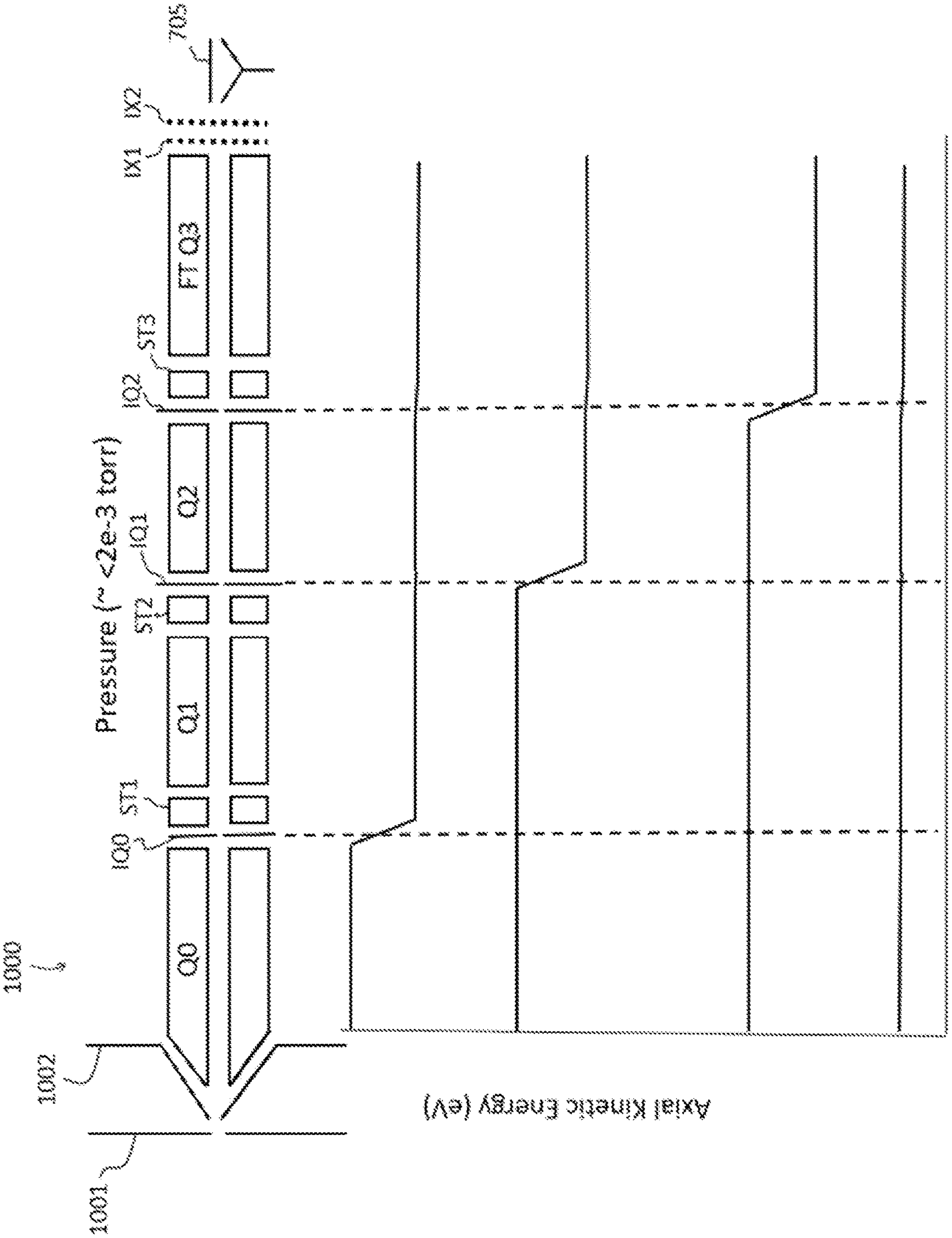

FIG. 4 schematically depicts a conventional FT mass spectrometer 1000 that was employed to obtain mass data for protonated reserpine (m/z=609). The mass spectrometer 1000 includes a curtain plate 1001, an orifice plate 1002 between which a gas curtain chamber is formed. Quadrupole ion guides Q0, Q1 Q2 and FTQ3 are disposed downstream of the curtain and the orifice plates, where Q0 ion guide can generate a focused ion beam, Q1 can be used for mass selection, which is followed by ion guide Q2. An ion lens IQ0 and a stubby lens ST1 separate the Q0 ion guide from the Q1 ion guide. Further, a stubby lens ST2 and an ion lens IQ1 separate the Q1 ion guide from Q2 ion guide. And an ion lens IQ2 and a stubby lens ST3 separate the Q2 from a downstream Fourier mass analyzer (FTQ3).

The ions exiting the Fourier mass analyzer FT Q3 pass through a pair of ion lenses IX1 and IX2 to reach an ion detector 705.

In the following experiments, the entire chamber of the mass spectrometer was pressurized to about 1.8 mtorr. The applied FTQ3 RF voltage had an amplitude of 271 V (0-peak), and the resolving DC voltage was set to zero.

Figure 5A:
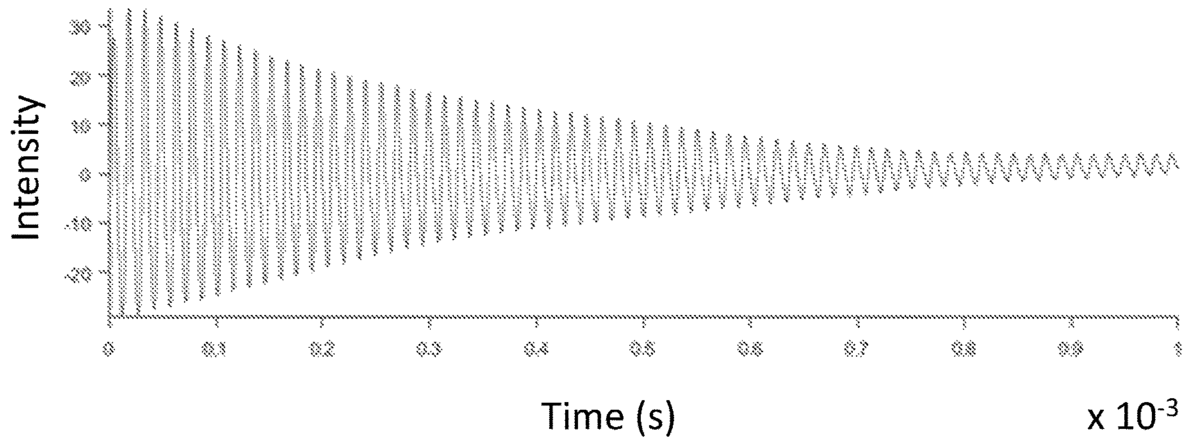
FIG. 5A shows an oscillatory ion signal detected by a detector of the mass spectrometer shown in FIG. 4, where ions are subjected to a small accelerating voltage and enter FTQ3 with 2 eV of energy.
Figure 5B:
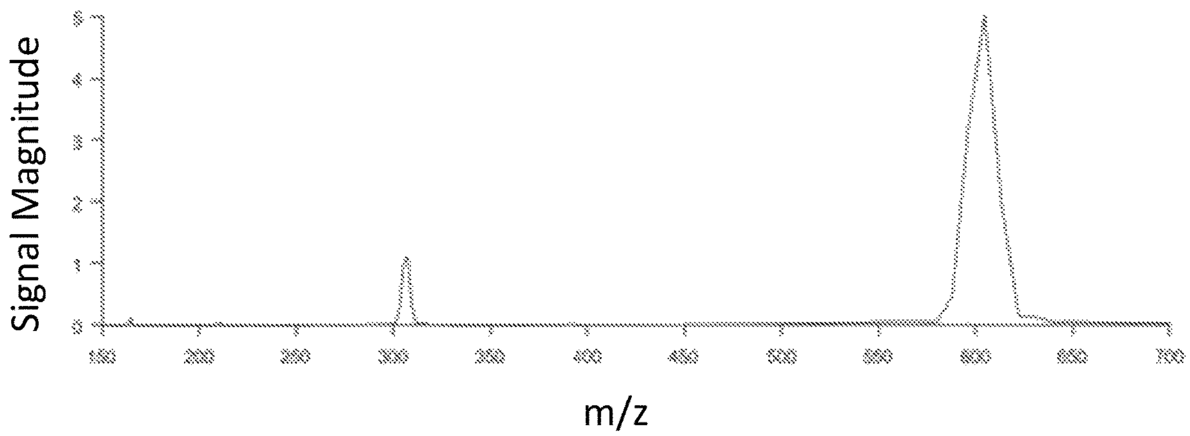
FIG. 5B is a Fourier Transform of the transitory signal depicted in FIG. 5A.

With reference to FIG. 4 as well as FIGS. 5A and 5B, in one experiment, the ions were subjected to a small accelerating voltage of about 2 volts as they transitioned from Q0 to Q1 ion guide, but the energy of the ions remained at this low level as they traversed through Q1, Q2, and FTQ3 to reach the ion detector 705. In this case, the low ion energy throughout the ion path leads to sufficient cooling of the ions and hence a long transient signal detected by the ion detector 705, as illustrated in the time signal depicted in FIG. 5A. However, as seen in FIG. 5B (which is a Fourier transform of the signal depicted in FIG. 5A), the low ion energy does not lead to any appreciable ion fragmentation (the extra peak just above m/z=300 is an artifact due to the 2ω frequency component).

Figure 6A:
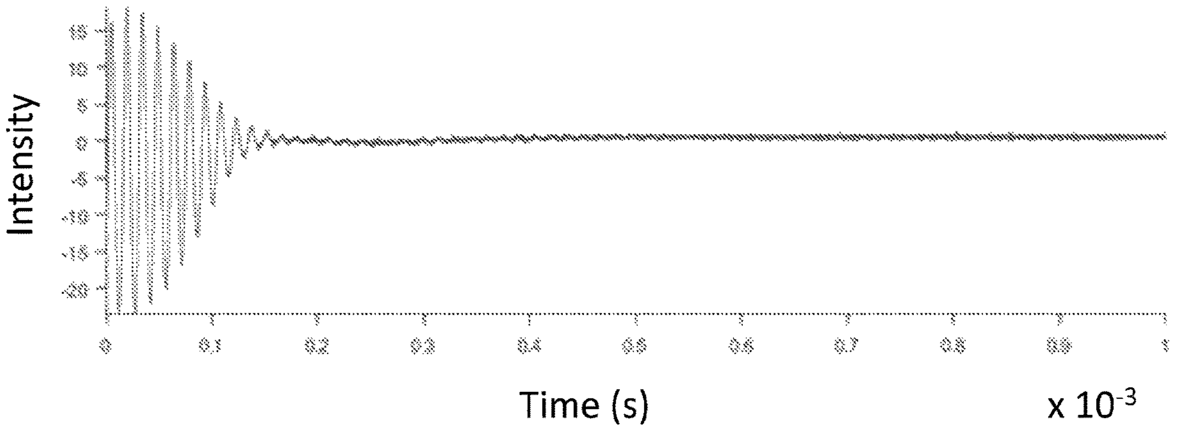
FIG. 6A shows an oscillatory transient ion signal detected by a detector of the mass spectrometer shown in FIG. 3 when the ions are subjected to an accelerating voltage of about 35 V between Q2 and Q3 ion guides.
Figure 6B:
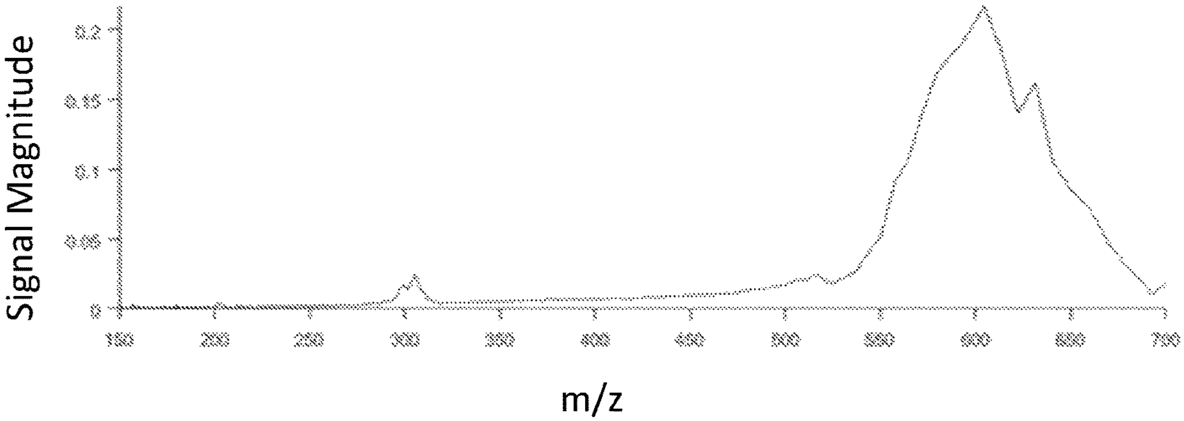
FIG. 6B depicts the Fourier transform of the transitory signal illustrated in FIG. 6A.

With reference to FIG. 4 as well as FIGS. 6A and 6B, in another experiment, the ions were accelerated between Q2 and Q3 to reach an energy of about 35 eV. This energy leads to a short transient (as shown in FIG. 6A) yielding poor resolution and too few collisions to give any appreciable fragmentation (as shown in FIG. 6B, which is a Fourier transform of the signal depicted in FIG. 6A).

Figure 7A:
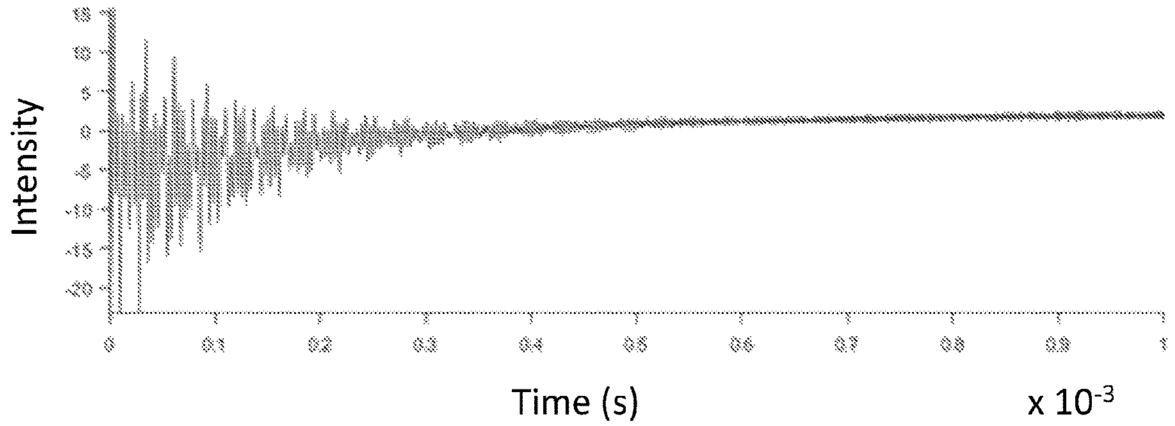
FIG. 7A shows an oscillatory transient ion signal detected by a detector of the mass spectrometer shown in FIG. 3 when the ions are subjected to an accelerating voltage of about 35 V between Q2 and Q3 ion guides.
Figure 7B:
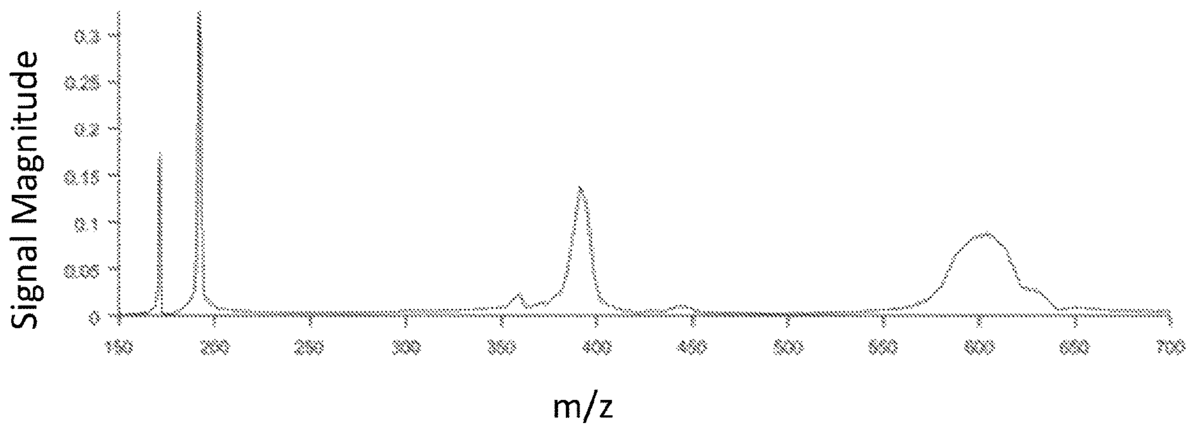
FIG. 7B depicts the Fourier transform of the transitory ion signal illustrated in FIG. 7A.

With reference to FIG. 4 as well as FIGS. 7A and 7B, in another experiment, the ions were accelerated between Q1 and Q2 to an energy of 35 eV, which defines the point of precursor ion activation. FIG. 7A shows the transient ion signal in the time domain and FIG. 7B shows the Fourier transform of the transient ion signal. The transient signal is still relatively short because there are not enough collisions between the point of precursor ion activation and Q3 FT quadrupole to reduce the ion energy to provide larger transients.

Figure 8A:
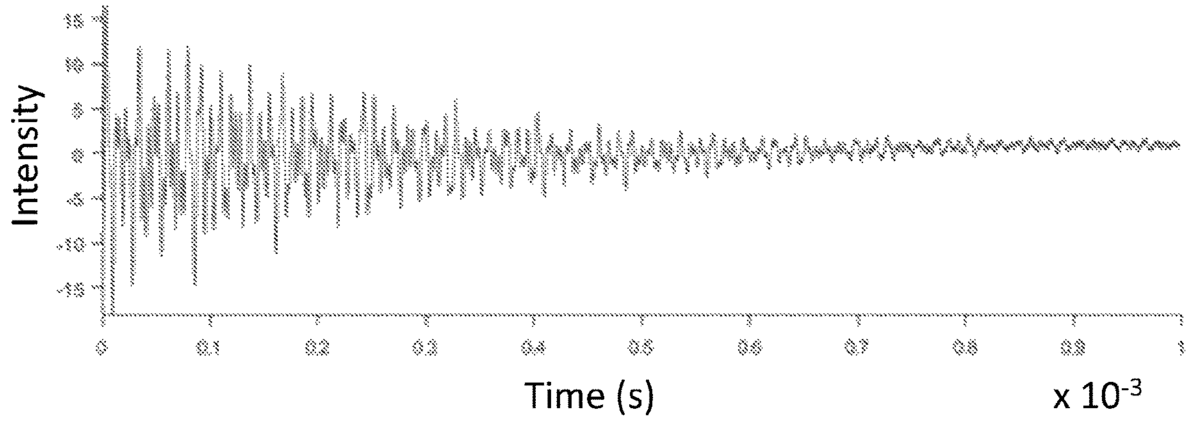
FIG. 8A shows an oscillatory transient ion signal detected by a detector of the mass spectrometer shown in FIG. 4, when the protonated reserpine ions at m/z of 609 are subjected to an accelerating voltage of about 35 V between Q0 and Q1 ion guides.
Figure 8B:
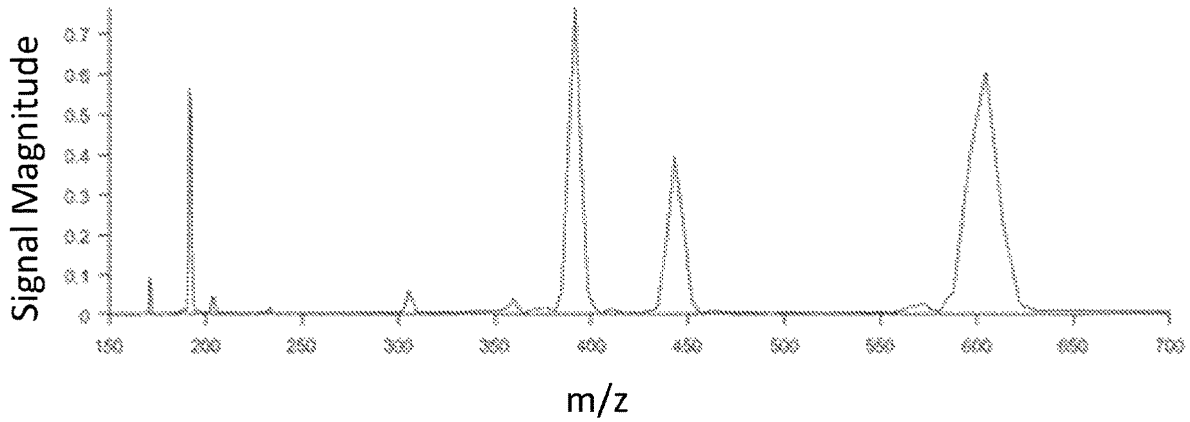
FIG. 8B is a Fourier transform of the transitory ion signal illustrated in FIG. 8A.

With reference to FIG. 4 as well as FIGS. 8A and 8B, in yet another experiment, the ions were accelerated between Q0 and Q2 to reach an ion energy of 35 eV. FIG. 8A shows the transient ion signal in the time domain, and FIG. 8B is the Fourier transform of the transient ion signal depicted in FIG. 8A. The observed transient signal is now much longer because of extra collisions between the point of precursor ion fragmentation and the FT Q3 quadrupole, thus reducing the ions' kinetic energy. There are also a smaller number of collisions to provide a rich fragmentation spectrum.

Hence, the use of the multi-segment ion guide allows adjusting the collisional cooling of the ions following ion activation by applying DC voltage offsets between different segments of the multi-segment ion guide.

Those having ordinary skill in the art will appreciate that various changes can be made to the above embodiments without departing from the scope of the present teachings, as indicated in the attached claims.

What is claimed is:

1. A mass spectrometer, comprising:

a Fourier Transform (FT) mass analyzer having an input port for receiving ions and an exit port through which the ions exit the FT mass analyzer, a detector disposed downstream of said FT analyzer for detecting ions exiting the FT analyzer, and a multi-segment radiofrequency (RF) ion guide having a plurality of segments, said multi-segment ion guide being disposed upstream of said FT mass analyzer and having an input port for receiving ions and an output port through which ions exit the FT mass analyzer, wherein said segments of the multi-segment ion guide are configured to be independently activated via application of a DC offset voltage thereto so as to adjust a length through which ions passing through the ion guide experience collisional cooling.

2. The mass spectrometer of claim 1, wherein a number of segments of said multi-segment RF ion guide is in a range of about 2 to about 200.

3. The mass spectrometer of claim 1, wherein said multi-segment RF ion guide is configured to permit adjusting said length in a range of about 10 mm to about 1000 mm.

4. The mass spectrometer of claim 1, wherein each segment of said multi-segment RF ion guide comprises a plurality of rods arranged in a multi-pole configuration.

5. The mass spectrometer of claim 4, wherein said RF multi-pole configuration comprises any of quadrupole, hexapole and octupole configuration.

6. The mass spectrometer of claim 5, further comprising at least one DC voltage source for applying said DC offset voltage to said segmented RF ion guide.

7. The mass spectrometer of claim 6, wherein said DC voltage source applies said DC offset voltage to at least one of said segments of the multi-segment RF ion guide via application of the DC offset voltage to at least one of said plurality of rods of said segment.

8. The mass spectrometer of claim 1, wherein said FT analyzer comprises a plurality of rods arranged in a multi-pole configuration.

9. The mass spectrometer of claim 1, wherein said multi-segment RF ion guide is maintained at a pressure in a range of about 1 $e^{-4}$ torr to about 5 $e^{-3}$ torr.

10. The mass spectrometer of claim 1, wherein said FT mass analyzer is maintained at a pressure in a range of about 1 $e^{-6}$ torr to about 5 $e^{-3}$ torr.

11. The mass spectrometer of claim 8, further comprising an RF voltage source for applying an RF voltage to one or more segments of said multi-segment RF ion guide for radial confinement of said ions as they pass through said segmented ion guide.

12. The mass spectrometer of claim 8, further comprising an AC voltage source for applying an excitation voltage to at least one rod of said FT mass analyzer so as to excite radial secular frequencies of a plurality of ions.

13. The mass spectrometer of claim 12, wherein said excited ions interact with fringing fields in vicinity of a distal end of the FT analyzer such that radial oscillations thereof are converted into axial oscillations.

14. The mass spectrometer of claim 13, wherein said FT mass analyzer comprises an auxiliary electrode and wherein said AC voltage source applies said excitation voltage to said auxiliary electrode.

15. The mass spectrometer of claim 1, further comprising a multipole mass analyzer disposed upstream of the multi-segment RF ion guide.

16. The mass spectrometer of claim 15, further comprising an ion guide disposed upstream of said multi-pole mass analyzer for receiving ions from an upstream source and focusing said ions.

17. The mass spectrometer of claim 15, wherein said multipole mass analyzer comprises a plurality of rods arranged according to any of a quadrupole, hexapole or octupole configuration.

* * * * *